US006800167B1

(12) United States Patent
Frazer

(10) Patent No.: US 6,800,167 B1
(45) Date of Patent: Oct. 5, 2004

(54) PRINTING SYSTEM FOR GENERATING PERSONALIZED MEMORIAL ITEMS, AND METHOD FOR GENERATING SUCH ITEMS

(75) Inventor: Matthew Glen Frazer, Portage, WI (US)

(73) Assignee: Funeral Management Solutions LLC, Portage, WI (US)

( * ) Notice: Subject to any disclaimer, the term of this patent is extended or adjusted under 35 U.S.C. 154(b) by 13 days.

(21) Appl. No.: 10/321,059

(22) Filed: Dec. 17, 2002

(51) Int. Cl.[7] .......................... B32B 33/00; G09F 1/02; G09F 3/10

(52) U.S. Cl. ...................... 156/249; 156/277; 156/289; 40/124.08; 40/124.5; 40/638

(58) Field of Search ............................... 156/247, 249, 156/277, 289; 40/1.5, 124.01, 124.05, 124.08, 124.5, 638

(56) References Cited

U.S. PATENT DOCUMENTS

| | | | |
|---|---|---|---|
| 5,036,472 A | 7/1991 | Buckley et al. | |
| 5,056,029 A | 10/1991 | Cannon | |
| 5,235,519 A | 8/1993 | Miura | |
| 5,272,549 A | 12/1993 | McDonald | |
| 5,459,819 A | 10/1995 | Watkins et al. | |
| 5,513,116 A | 4/1996 | Buckley et al. | |
| 5,600,563 A | 2/1997 | Cannon et al. | |
| 5,687,087 A | 11/1997 | Taggart | |
| 5,748,484 A | 5/1998 | Cannon et al. | |
| 5,751,590 A | 5/1998 | Cannon et al. | |
| 5,930,810 A | 7/1999 | Farros et al. | |
| 6,327,048 B1 * | 12/2001 | Wen | 358/1.18 |
| 6,408,132 B1 | 6/2002 | Ishikawa | |

* cited by examiner

*Primary Examiner*—Melvin C. Mayes
*Assistant Examiner*—Sing P Chan
(74) *Attorney, Agent, or Firm*—Craig A. Fieschko, Esq.; DeWitt Ross & Stevens S.C.

(57) ABSTRACT

A funeral home director or other party who wishes to generate a personalized memorial item (for example, a casket display) is provided with stock display sheets, which are most preferably formed of adhesive label sheets having easily peelable/removable precut display sheet print fields. The director is provided with software allowing text and images to be designed, edited, and printed onto the display sheet print fields in a form representing how the director would like such text and images displayed on the memorial item if it was personalized. The printed display sheet print fields may then each be affixed to a corresponding memorial item print field on the memorial item. If the background color of the display sheet print field is coordinated with the background color (or average color) of the stock imagery surrounding the is memorial item print field, the display sheet print field will visually "meld into" the memorial item when affixed thereon, thereby making it appear as if the image(s) and text on the display sheet print fields were printed directly on the memorial item print fields.

18 Claims, 3 Drawing Sheets

PRINTING SYSTEM FOR GENERATING PERSONALIZED MEMORIAL ITEMS, AND METHOD FOR GENERATING SUCH ITEMS

FIELD OF THE INVENTION

This disclosure concerns an invention relating generally to generation of memorial items (such as casket displays, prayer cards, funeral programs/brochures, and the like), and more specifically to the use of standard home or office printing equipment to generate personalized memorial items having a professionally printed appearance.

BACKGROUND OF THE INVENTION

In the funeral industry, there has been an increasing trend towards personalization of funeral services. As an example, prayer cards—small cards bearing prayers, and comforting sayings and images—are often distributed to attendees of funeral services. At some point, funeral homes began to stamp or otherwise print the name of the deceased on these cards so that the prayer cards would be more meaningful to funeral attendees, and so that the cards might serve as a valued keepsake. At present, some funeral homes now offer personalized prayer cards, casket displays, funeral programs/brochures, and similar matter. Personalization may go no further than stamping the name of the deceased and his/her dates of birth and death on memorial items, but in some cases it can extend so far as to include professionally custom-printed images of the deceased (and images of important people, items, and events from his/her life); and/or extended passages of text regarding the deceased (such as an autobiography, or writings of the deceased, or press materials regarding the deceased).

However, generation of personalized memorial items can be problematic, particularly as the degree of personalization grows. The family of the deceased generally insists that any personalized memorial items be of high quality to avoid disrespect to the deceased's memory. To obtain high quality, generation of the memorial items must almost invariably be contracted out by a funeral home to a professional printing house. The average funeral home is incapable of generating memorial items with the requisite quality because it is only equipped with standard office printing equipment, such as an inkjet or laser printer (and perhaps a color laser printer), and these generally cannot produce professional-looking materials. This is particularly true since most memorial items have unusual sizes which are too small or too large to be effectively fed through a standard printer (such as prayer cards, bookmarks, and casket displays); or they have unusual formats which are too thick or rigid to be fed through a standard printer (such as cardboard pocket folders, or displays and guest register covers made of foamboard or thick cardstock). Additionally, most standard printers cannot consistently generate professional-looking high-resolution prints, especially full-color prints, on many types of professional stock (such as laminated or polymer-coated cardstock, or on photo paper).

Sending the memorial items to an outside printing house leads to significant time and cost concerns. There is generally only a short amount of time between a death and a funeral, and while printing memorial items is generally a short-run project (since usually only a few hundred copies are needed at most), there are limited numbers of printing shops that provide immediate-need and short-run print jobs at affordable cost. There are a few printing concerns that cater heavily or exclusively to the funeral industry, but since there are only a few such concerns, most funeral homes must ship information and materials to these printing houses via express courier and hope that the memorial items are returned by express courier in time for the funeral. Naturally, if the memorial items are not returned in time, or if they do not arrive in the form-expected (since there is generally little or no time for review and approval of prototype memorial items), this can cause significant distress to the family of the deceased—and significant trouble for the funeral director. It would therefore be useful to have available methods and apparata for generating personalized memorial items having a professionally-printed, high quality appearance, but which may be quickly and inexpensively generated on-site at a funeral home or the like.

SUMMARY OF THE INVENTION

The invention involves methods and systems, particularly software systems, which are intended to at least partially solve the aforementioned problems. To give the reader a basic understanding of some of the advantageous features of the invention, following is a brief summary of preferred versions of the invention. As this is merely a summary, it should be understood that more details regarding the preferred versions may be found in the Detailed Description set forth elsewhere in this document. The claims set forth at the end of this document then define the various versions of the invention in which exclusive rights are secured.

To generate a personalized memorial item, a user initially selects a memorial item to be personalized (for example, a casket display/photo panel, a memorial portrait, a cover for a funeral register, and so on). The memorial item is preferably mass produced, and is preprinted with some form of stock imagery (such as religious scenes, nature scenes, and the like) using high quality printing processes. However, the memorial item also preferably includes one or more memorial item print fields, discrete areas whereupon personalized printing is desired. The memorial item print fields may simply be areas which lack printing (i.e., the stock imagery is not printed on these areas), or they may instead be areas bearing markings defining the borders of the print fields.

Most of the foregoing memorial items cannot be personalized by simply having a user utilize a laser printer, inkjet printer, or other printing device to print in the memorial item print fields, since the memorial items are generally not provided in sizes or formats suitable for use in common printing devices. Thus, the user is preferably provided with stock display sheets, which are most preferably formed of adhesive label sheets having easily peelable/removable precut display sheet print fields. Such stock display sheets may be provided in different configurations wherein their display sheet print fields are sized and configured for installation atop corresponding memorial item print fields (in other words, the display sheet print fields may be peeled off of their display sheets and adhered atop the memorial item print fields having the same shapes/sizes). However, before placing the display sheet print fields on the memorial item print fields, the display sheet is first personalized by using a printing system, preferably one which is software driven, to print images and/or text related to the deceased within the display sheet print fields. The software preferably displays a working template containing one or more template print fields, each of which simulates the appearance of one of the display sheet print fields. The user may enter one or more images and/or text strings into selected template print fields (with such images and text relating to matters relevant to the deceased), and edit the images and text within the template print fields to have the desired appearance when they are later printed in the display sheet print fields. For example, a user could take an image of the deceased and center and/or resize it within a template print field, and thus within a corresponding later-printed display sheet print field.

When the user then prints the working template, the images and/or text strings within each of the template print fields is printed to a corresponding display sheet print field on the display sheet. The display sheet print fields are then personalized, and they may each be affixed to a corresponding memorial item print field on the memorial item. If the background color of the display sheet print field is coordinated with the background color (or average color) of the stock imagery surrounding the memorial item print field, the display sheet print field will visually "meld into" the memorial item when affixed thereon, thereby making it appear as if the image(s) and text on the display sheet print fields were printed directly on the memorial item print fields. Additionally, while one might expect that the display sheet print fields—which are generally printed on standard office printing equipment, with significantly lesser quality than the surrounding professionally-printed imagery of the memorial item—would suffer from visibly deficient quality, it has been found that the usual effect is that the quality of the display sheet print fields has the impression of being improved by the combination, rather than the quality of the surrounding professionally-printed matter being degraded. The end result is that the personalized memorial item is granted a professionally manufactured appearance, as if it was generated by a professional printing concern, even though it was rapidly produced by standard office printing equipment at exceptionally low cost.

Further advantages, features, and objects of the invention will be apparent from the following detailed description of the invention in conjunction with the associated drawings.

DETAILED DESCRIPTION OF PREFERRED EMBODIMENTS OF THE INVENTION

Figure 1:
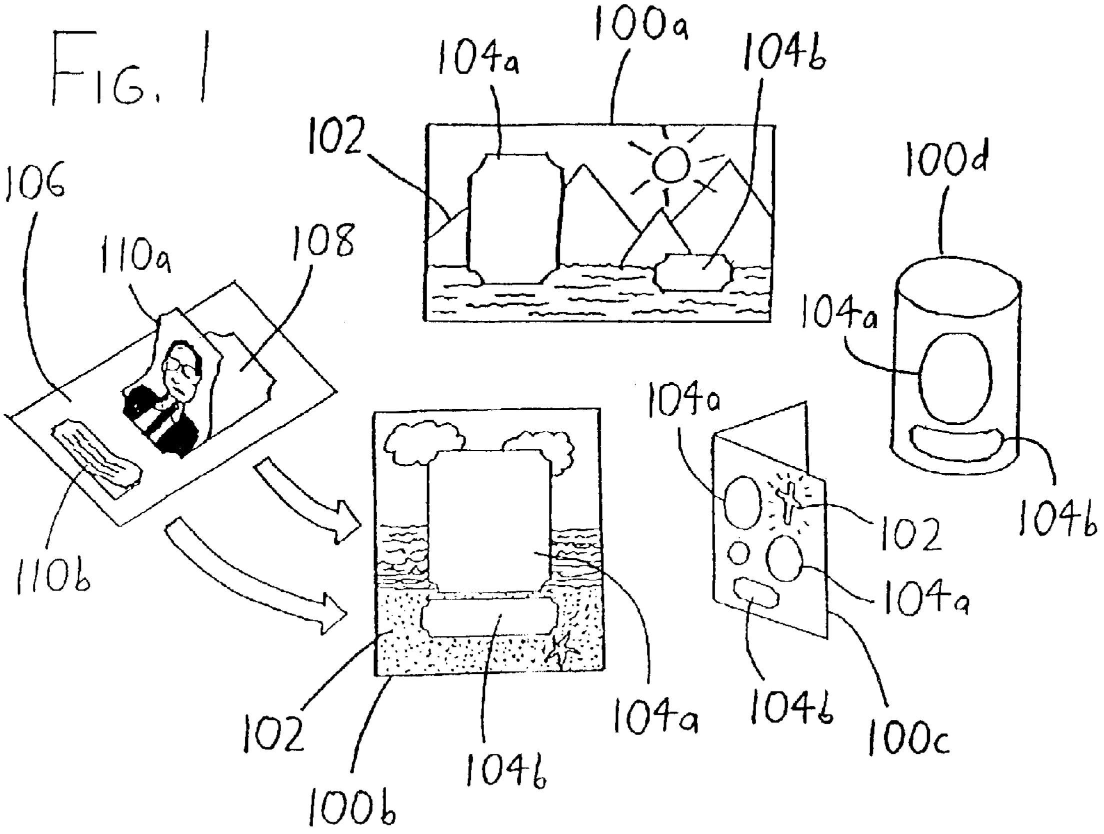
FIG. 1 is a perspective view of a custom-printed display sheet 106 along with various mass-produced "blank" memorial items—a casket panel 100*a*, a memorial portrait 100*b*, a funeral program/brochure 100*c*, and a memorial service candle 100*d*—wherein the memorial items will be personalized by affixing display sheet image print fields 110*a* (which bear images of a deceased person) to their memorial item image print fields 104*a*, and by affixing display sheet text print fields 110*b* (which bear relevant text) to their memorial item text print fields 104*b*.

An exemplary version of the invention will now be reviewed with reference to the various drawings accompanying this document, wherein FIG. 1 illustrates examples of various memorial items that can be personalized with use of the invention. In FIG. 1, the illustrated memorial items are a casket panel 100*a*, a panel which is generally formed of thick cardboard or foamboard for display on or adjacent a casket (e.g., on an easel); a memorial portrait 100*b*, a portrait on a plaque or other stiff mounting board which may be displayed at some area wherein a memorial service is being performed; a funeral program/brochure 100*c*, which is generally a folded and/or stapled booklet which may provide a schedule of the memorial service, and matters such as a biography of the deceased; and a memorial service candle 100*d*, which is often lit and displayed at a memorial service. The various memorial items (which will henceforth be collectively indicated by the reference numeral 100) are not shown in FIG. 1 in personalized form, but as discussed below, they may be personalized/customized to fit the preferences of the organizers of the memorial service—for example, they may bear images of the deceased and/or of events in the deceased's life, as well as text having some relevance to the deceased and/or to the deceased's memorial service. The following discussion describes certain preferred ways to achieve such personalization of memorial items.

The memorial items 100 are preferably premanufactured in quantity, and each memorial item 100, while lacking any personalization, is preferably preprinted with a stock image (or images) 102 over a majority of its observable surface. Since the memorial items 100 are generally intended for use at memorial services, wakes, funeral services, and other gatherings of this nature, the stock images 102 are preferably of a peaceful, comforting, and/or spiritual nature so as to provide scenes which are soothing to a mourner—for example, the stock images 102 may have a religious and/or nature theme. Text such as passages from religious texts, poetry, or the like may alternatively or additionally be used within the stock images 102. By mass producing the memorial items 100, equipment and materials of high quality (such as use of professional-grade lithographic or other printing techniques) may be cost-effectively used. Of course, it would be exceedingly expensive to print small runs of personalized memorial items 100 using such techniques owing to the costs of reconfiguring and "re-personalizing" the printing equipment for each run. Thus, the memorial items 100 are mass produced in a "generic" form allowing them to be personalized in the manner described in greater detail below.

Apart from the stock images 102, the memorial items 100 preferably each bear discrete print fields, shown in FIG. 1 as an image print field 104*a* and a text print field 104*b* (which will be collectively referred to as the print fields 104). The print fields 104 are areas which are well-defined in comparison to the remainder of the various memorial items 100, i.e., they readily stand out visibly from the surrounding stock images. The memorial items 100 illustrated in FIG. 1 are shown with print fields 104 which are simply defined by having "blank" areas on the memorial items 100, more specifically, unadorned/unprinted areas which simply have the same color as the underlying substrate upon which the stock images 102 are printed. The print fields 104 could instead be defined by printing a region having an at least substantially uniform background color onto the memorial items 100 (for example, printing a white or other uniformly-colored field); by printing border lines or other marks about the boundaries of the print fields 104; or otherwise visibly indicating at least portions of the borders of the print fields 104. This includes the possibility that the print fields 104 might be marked in such a way that they are not readily visible unless a funeral director or other user knows what to look for. For example, the print fields 104 might be partially bounded by markings which almost imperceptibly blend into the stock images 102 and which are virtually unnoticeable unless and until one is made aware of their presence, or the print fields 104 (or their borders) might be printed in an ink which is only visible under special lighting (e.g., ultraviolet or "black" light), or by use of special viewing apparatus.

The print fields 104 are then customized to generate a personalized memorial item by use of a display sheet 106, an example of which is also illustrated in FIG. 1. The display sheet 106 is preferably formed as a portion of a common printable adhesive-backed label sheet, wherein the display sheet 106 has an adhesive backing (not shown) and is adhered to a peelable backing sheet 108. Such a display sheet 106 is preferably formed of opaque stock, though transparent label stock could be used instead. The display sheet 106 includes display sheet print fields, more specifically a display sheet image print field 110*a* and a display sheet text print field 110*b* (which will be collectively referred to as the display sheet print fields 110). Each of the display sheet image print field(s) 110*a* and the display sheet text print field(s) 110*b* is sized, shaped, and precut about its borders so that it may be readily removed from the backing sheet 108 and adhered to its complementary memorial item image print field 104*a* and memorial item text print field 104*b*, with the borders of the affixed display sheet print fields 110 being generally contiguous with the borders of the memorial item print fields 104. Whereas the memorial items 100 are mass produced in generic form, the display sheet print fields 110 are printed in short runs on stock display sheets 106 by use of a standard printing device, preferably a color laser printer, color ink jet printer, or other office or home printing device. It has been found that so long as the display sheet print fields 110 are printed with at least moderate quality—for example, when images and/or text are printed at 200 dots per inch resolution by use of a four-color inkjet printer—the customized memorial item 100 resulting from the placement of the display sheet print fields 110 on the stock memorial item 100 nonetheless provides the memorial item 100 with an appearance of very high quality manufacture. This is somewhat surprising since the memorial item 100 would have a somewhat crude and homemade appearance if it was printed at such a quality level in its entirety, rather than merely having the display sheet print fields 110 printed in this manner. Additionally, as will be discussed below, images to be printed on the display sheet print fields 110 are often obtained via scanning or otherwise imaging preexisting photographs of the deceased. The scanning process tends to introduce degradation of the print quality of the image above and beyond that which would occur from the printing process alone. However, the high quality of the mass-produced (and yet-to-be-personalized) stock memorial item 100 apparently distracts from and minimizes any deficiencies in the print quality of the display sheet print fields 110.

Additionally, where the personalized display sheet print fields 110 are adhered or otherwise affixed to the separate stock memorial item 100, they also tend to have the appearance of being directly printed upon the memorial item 100 so long as the display sheet 106 is not too thick (i.e., the use of heavy stock for the display sheet print fields 110 is preferably avoided), and so long as the surface finish of the memorial item 100 and display sheet 106 at least approximate each other (i.e., both the memorial item 100 and display sheet 106 preferably have at least approximately the same matte, semigloss, or gloss finishes). Of course, different stock thicknesses and/or surface finishes may be used if it seems desirable to have any display sheet print fields 110 appear as if they were separately formed from, and later applied to, the memorial item 100. However, where the display sheet print fields 110 appear as if they were directly printed upon the memorial items 100, this can significantly enhance the aesthetic attractiveness of the memorial items 100. This is true in part because most memorial items 100, being made of materials which are too stiff, thick, and/or oddly-shaped to be processed in conventional printing apparata, give an impression of being expensive custom-crafted items once they are personalized by use of the invention.

Before executing the processes embodied in the exemplary screen displays of FIGS. 2–5, a user is preferably provided with a number of "blank" stock memorial items 100, such as the memorial items 110*a*, 100*b*, 100*c*, etc. illustrated in FIG. 1. Additionally, the user is also preferably provided with a number of display sheets 106, with these display sheets being configured to contain display sheet print fields 110 corresponding to the memorial item print fields 104 of the various memorial items 100. In other words, the user is preferably provided with a kit including both memorial items 100 and the respective blank display sheets 106 configured for printing/personalization and application to each of the memorial items 100. For example, one display sheet 106 provided to the user might include a number of display sheet print fields 110 defined thereon which are sized and configured to match the print fields 104 on the casket panel 100*a*; another display sheet 106 provided to the user might have one or more display sheet print fields 110 which are sized and configured for placement on the print fields 104 of the memorial portrait 100*b*; and so on. Preferably, the user will have both the memorial items 100 and the display sheets 106 at hand when implementing the processes described below.

Figure 2:
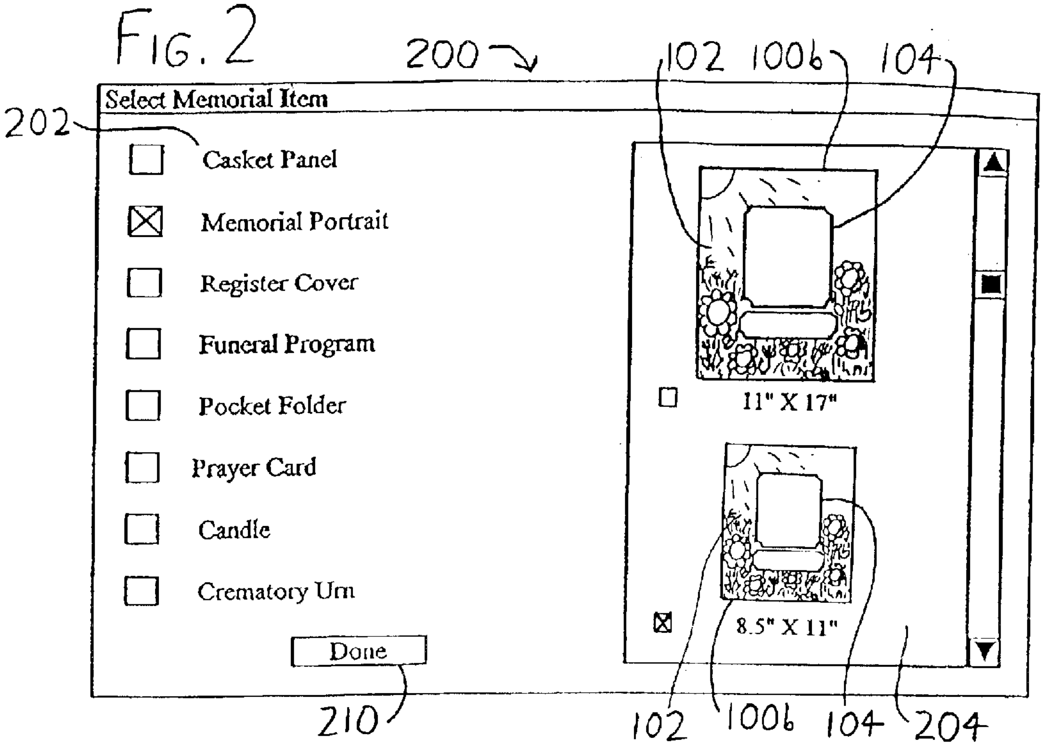
FIG. 2 is a view of an exemplary "Select Memorial Item" screen 200 which might be used in a software implementation of the invention to allow a user to specify what types, styles, and sizes of memorial items are to be personalized (which will at least partially dictate the types, styles, and contents of any display sheets 106 that are generated to personalize the memorial items).
Figure 3:
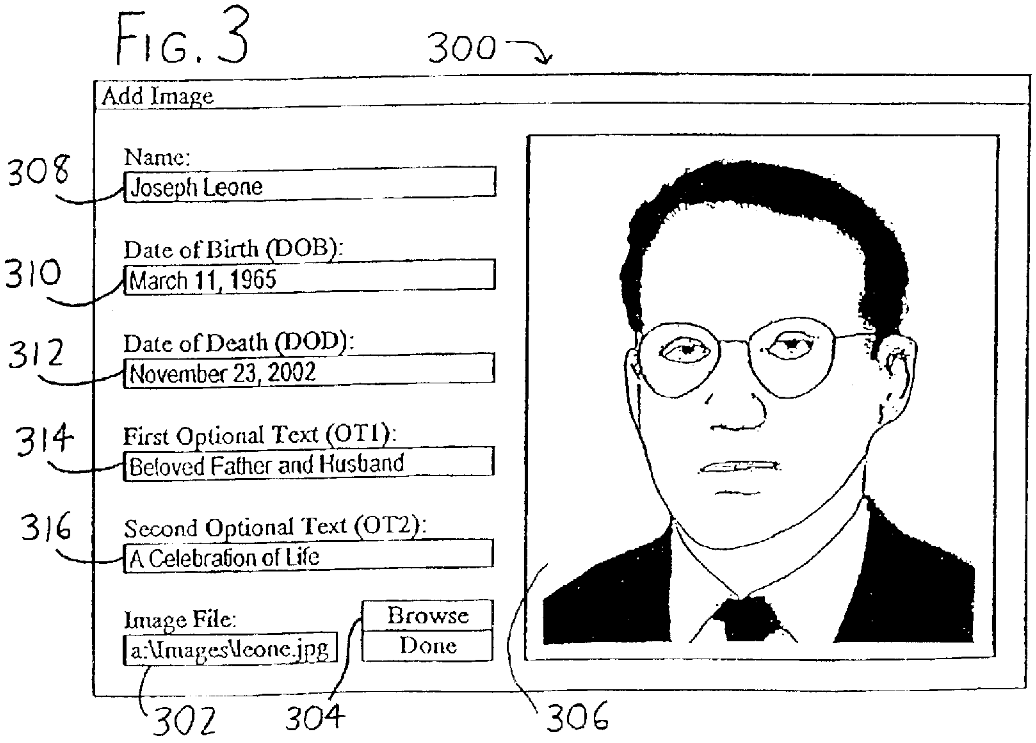
FIG. 3 is a view of an exemplary "Add Image" screen 300 which might be used in a software implementation of the invention to enter and/or access images and text for later printing onto appropriate display sheet image print fields 110*a* and display sheet text print fields 110*b* of display sheets 106.
Figure 4:
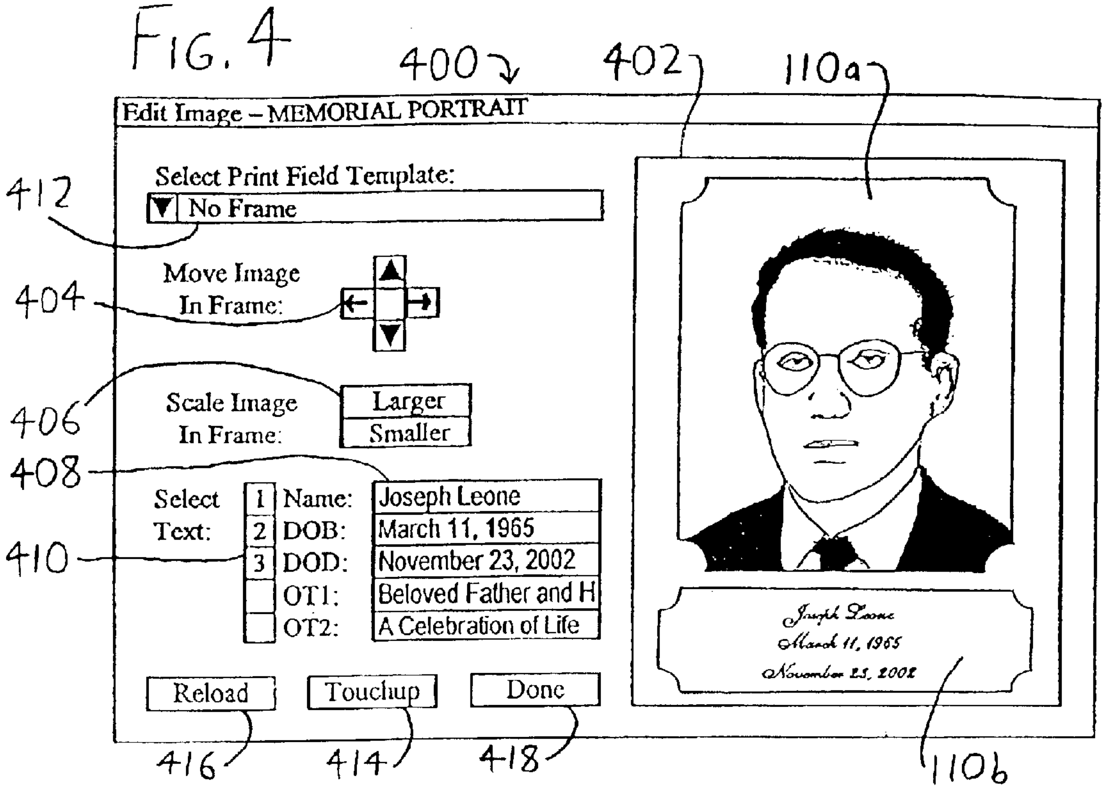
FIG. 4 is a view of an exemplary "Edit Image" screen 400 which might be used in a software implementation of the invention to size and situate selected images and text on a working template 402, which simulates at least a portion of a desired (but yet to be printed) display sheet 106, to assist in the design of such a display sheet 106.

FIGS. 2–4 then illustrate exemplary screen displays which might be shown in a software or firmware implementation of the invention, as it would appear on a display while running on an electronic processor. The electronic processor used to implement the invention is preferably provided in the form of a personal computer, generally of the desktop or laptop type (though handheld or other types of personal computers may be used instead). The electronic processor could instead (or additionally) be provided within the processing/controls systems of multifunction photocopiers or other imaging/image processing systems (e.g., in self-service image processing/photoediting kiosks or in self-service photography booths), or in other electronic processing systems wherein displays are coupled to input devices to allow a user to provide and manipulate image and/or text or other input. Any electronic processor used to implement the invention is preferably coupled to a monitor or other display (whereupon the screen displays FIGS. 2–5 might be shown). Additionally, the electronic processor is preferably coupled to a printing device, such as a laser printer or inkjet printer, to allow the user to print customized display sheets 106.

Turning then to the exemplary software of FIG. 2, the user is first presented with a "select memorial item" screen 200 which contains a checklist 202 wherein the user may specify which memorial item(s) 100 is/are to be personalized by the invention. The memorial items 100 which may be generated by the exemplary software are listed on the checklist 202 as a "casket panel"; a "memorial portrait", a "register cover", a "funeral program", a "pocket folder", a "prayer card"; a "candle"; and a "crematory urn". When a particular type of memorial item is selected from the checklist 202, a memorial item subwindow 204 is displayed which depicts the various styles of the selected memorial item 100 that might be available. In other words, the memorial item subwindow 204 may illustrate the selected memorial item 100 and its different available sizes, different available stock images 102, different available placements of its memorial item print field(s) 104, etc. In FIG. 2, two available styles of memorial portraits 100*b* are illustrated in the memorial item subwindow 204, with each bearing the same stock image 102 and generally the same print field 104 placement, but having different sizes. Within the memorial item subwindow 204, the user may select the specific memorial item(s) that are to be personalized. Once the user has selected the desired style(s) of any particular type of memorial item from the memorial item subwindow 204, the user may, if desired, go on to select one or more additional types of memorial items from the checklist 202, and to select the desired styles of the selected memorial items from their memorial item subwindows 204. Once the process of selecting all desired memorial items and memorial item styles is completed (with the user having thereby selected all of the types and styles of memorial items 100 which the user wishes to generate and personalize by use of the invention), the user may then select the Done button 210 to proceed to the "add image" screen 300 depicted in FIG. 3.

In the "add image" screen 300, the user specifies any images and/or text that the user wishes to apply to a display sheet 106 (and in turn apply to a memorial item 100). More specifically, the user may specify any images to be situated on display sheet image print fields 110*a* (and thus on memorial item image print fields 104*a*), and any text to be situated on display sheet text print fields 110*b* (and thus on memorial item text print fields 104*b*). The user may enter into the software any image desired for placement on a memorial item 100 by inputting the location of an image file at an image file entry field 302, and/or by browsing for a desired image file by use of a browse button 304. The specified image file is displayed within an image subwindow 306, allowing the user to determine whether the correct image file has been selected.

Once the user specifies the desired image/image file for placement on some or all of the personalized memorial items 100 to be generated by use of the invention, the user may then enter text which may be desired for inclusion on any customized memorial items 100. The "add image" screen 300 allows a user to enter biographical data into fields such as a name field 308, a date of birth field 310, and a date of death field 312, though the invention might alternatively or additionally include other types of biographical data fields. As examples, the "add image" screen 300 also includes first and second optional text fields 314 and 316, which allow entry of other potentially desirable text such as words, sentences, or narratives relevant to the deceased.

After specifying the image(s) and text to be included on any personalized memorial items(s), the user may proceed to the "edit image" screen 400 of FIG. 4, one of which is generated for each of the memorial items selected in the "select memorial item" screen 200 of FIG. 2. The "edit image" screen 400 includes a working template subwindow 402 which displays an image of the appearance of one or more of the display sheet print fields 110, as these print fields 110 are to appear on the display sheet 106 when it is being printed. A user is able to view and manipulate images of the planned print fields 110 in the working template 402, allowing the user to visualize and affect how the selected image(s) and text may appear when they are later printed on an actual physical display sheet 106. Noting that the user selected a 8.5 inch×11 inch memorial portrait in the "select memorial item" screen 200 of FIG. 2, the particular working template 402 illustrated in FIG. 4 shows how a corresponding display sheet image print field 110*a* and display sheet text print field 110*b* would appear prior to printing on a display sheet 106 (which might be of 8.5 inch×11 inch size, or of another size).

Within the working template 402, the image(s) selected by the user in the "add image" screen 300 of FIG. 3 are placed within the simulated display sheet image print field 110*a*. If the user so desires, the user may then reposition the image within the simulated display sheet image print field 110*a* by use of motion buttons 404, and/or may resize the image within the display sheet image print field 110*a* by use of size buttons 406. When moving or resizing the image within the display sheet image print field 110*a*, the edges of the image will automatically be cropped so that the image does not extend beyond the borders of the display sheet image print field 110*a*.

The working template 402 may also include text fields 408 which display at least some of the text previously specified by the user in the "add image" screen 300 of FIG. 3. The user is allowed to enter a rank into adjacent ranking fields 410 to indicate which text strings are to be placed on later-printed display sheet text print fields 110*b*, and the order in which they are to be presented on such display sheet text print fields 110*b*. In FIG. 4, the deceased's name, date of birth and date of death are ranked in that order, and thus the text entered in FIG. 3's name field 308, date of birth field 310, and date of death field 312 are displayed in the ranked order within the facsimile display sheet text print field 110*b* shown in the working template 402 (and this text is also displayed in centered and evenly-spaced proportion).

Additionally, if the user desires, the user may choose a border to be displayed (and later printed) around the display sheet image print field 110*a* and the display sheet text print field 110*b* by selecting the desired border from a border menu 412. For example, while the "edit image" screen 400 currently depicts "No Frame" being chosen from the border menu 412 (and thus the image and text will simply be printed on their respective display sheet print fields 110*a* and 110*b* without any surrounding borders), the user might instead choose to install decorative printed borders surrounding the print fields 110. As examples, a user might choose "wooden frame"(for the image(s) and text to later be printed within a surrounding printed wooden frame bordering their print fields); "wreath frame" (for the image(s) and text to later be printed within a surrounding printed wreath bordering their print fields); "flower frame"(for the image(s) and text to later be printed within a surrounding printed ring of flowers bordering their print fields); etc. Additionally or alternatively, rather than "drawing in" a border, the border of the display sheet print fields 110*a* and 110*b* (or at least the display sheet image print field 110*a*) might be treated so that the image in the display sheet image print field 110*a* begins to "fog" into a uniform color as the image extends closer to the border—in effect, placing the image of the deceased in soft focus around the edges of the display sheet image print field 110*a*, and in sharp focus near the center of the field

110*a*, so that the viewer's eye is directed to the center of the field 110*a*. In this case, a type of border is added not so much by adding or superimposing features over the image in the display sheet image print field 110*a*, but rather by modifying the image therein.

Thus, by use of the "edit image" screen 400, the user is able to situate and size a desired image of the deceased within the working template 402 as desired, and thus place the image as desired within any yet-to-be-printed display sheet 106. Additionally, the user may place some or all text associated with the image within the working template 402 for later printing into the corresponding text print field 110*b* of the yet-to-be-printed display sheet 106. The "edit image" screen 400 might include other or additional functions for design of a display sheet 106, such as a Touchup button 414 which allows the user to access a photo editing program for precise editing of the image. Alternatively or additionally, the user may edit any of the text previously entered in the name field 308, date of birth field 310, date of death field 312, etc. by editing that text as presented in the text fields 408.

If the user makes undesirable editing choices which the user does not want carried to any later printed display sheet 106, the user may use the Reload button 416 to reset the "edit image" screen 400 to the state it was in before the user performed any editing. Alternatively, the user might hit the Done button 418 to proceed to the "print image to display sheet" screen 500 of FIG. 5, which is discussed at greater length below.

Figure 5:
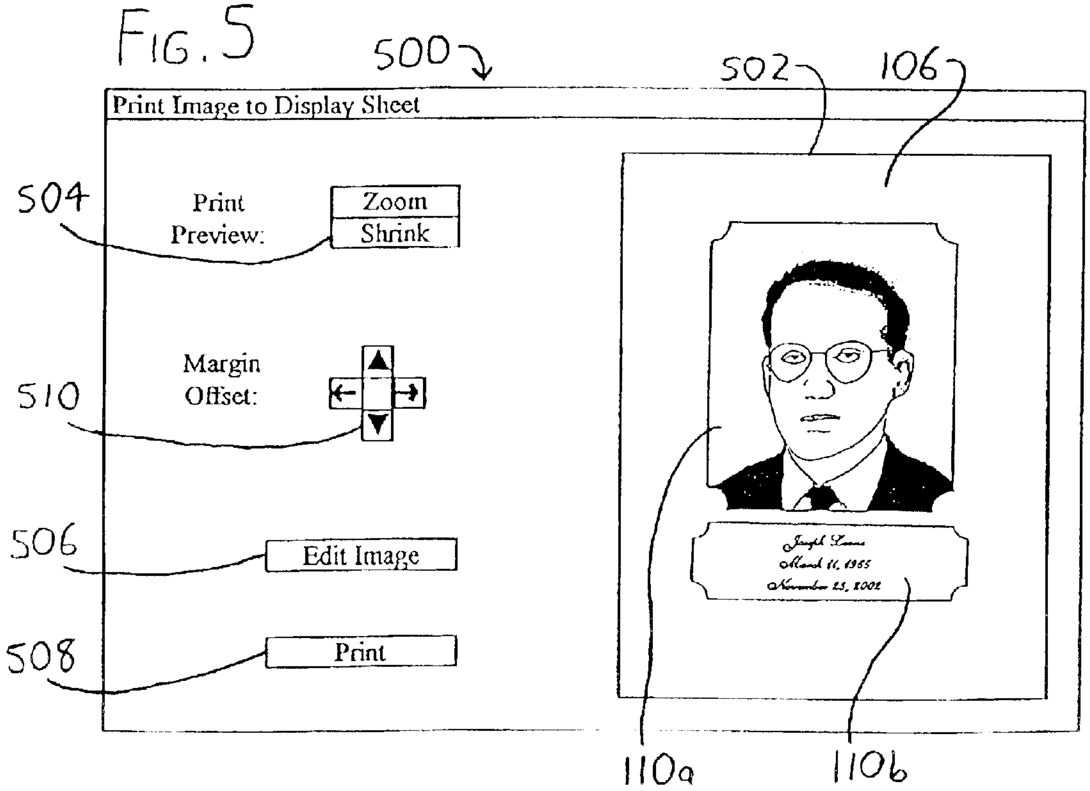
FIG. 5 is a view of an exemplary "Print Image to Display Sheet" screen which might be used in a software implementation of the invention to view and print the display sheet 106 that results from the operations of the "Edit Image" screen 400 of FIG. 4.

Turning to FIG. 5, in the "print image to display sheet" screen 500, a display sheet window 502 shows a simulated display sheet 106, illustrating the entirety of the display sheet 106 as it will appear when printed. The user may utilize print preview buttons 504 to more closely examine any portion of the facsimile display sheet 106 (as by zooming in on some portion of the facsimile sheet 106). If the user determines that changes are desired, the user may press the Edit Image button 506 to return to the "edit image" screen 400 (as shown in FIG. 4) for revision. Otherwise, a user may simply hit the Print button 508, at which point the computer or other electronic processor will have any associated printing device print the facsimile display sheet 106 (as illustrated in the display sheet window 502) onto any corresponding actual display sheet 106 situated within the printing device. The printed display sheet 106 will only be usable if the print fields 110*b* and 110*a*, as displayed on the working template 402 (FIG. 4) and the display sheet window 502 (FIG. 5), are properly sized and situated to correspond with the print fields 110*a* and 110*b* on the physical display sheet 106 (FIG. 1). Thus, before printing the display sheet 106 corresponding to FIGS. 2–5, the software might first display a message such as "verify display sheet for 8.5 inch by 11 inch Memorial Portrait is in printer" or the like. Otherwise, if the wrong blank display sheet 106 is accidentally placed in the printer—for example, the display sheet 106 corresponding to the funeral program/brochure 100*c* of FIG. 1—the print fields 110*a* and 110*b* will be mislocated and improperly sized, and the resulting customized display sheet 106 would be unusable. Additionally, margin offset buttons 510 are preferably provided so that if the printed customized display sheet 106 does not have the image and text situated as desired within its display sheet image print fields 110*a* and text print fields 110*b* (for example, if the image(s) and text are printed with a slight offset), the user may use the margin offset buttons 510 to slightly reposition the image and text before reprinting the display sheet 106.

When the invention is used to generate a customized display sheet 106, it preferably uses the memorial item 100 specified at the "select memorial item" screen 200 to not only define the size, shape, and location of any display sheet image print field 110*a* and display sheet text print field 110*b*, but it also preferably prints these fields 110 so that they have a background color and/or pattern which closely matches the ambient color and/or pattern of the stock image 102 of the selected memorial item 100. Stated differently, when a customized display sheet 106 is printed for any specified memorial item 100, it is preferably printed so that when its display sheet image print field 110*a* and display sheet text print field 110*b* are later affixed to the memorial item 100, they will closely "blend into" the memorial item 100 so that the text on the print fields 100 appears to be printed directly on the memorial item 100, rather than being printed onto labels which are then affixed to the memorial item.

After printing, the end result is that the user has a personalized display sheet 106, with the user-selected (and edited) image(s) and text printed thereon within the display sheet image print field(s) 110*a* and text print field(s) 110*b*, and with these print fields 110 having backgrounds which will (preferably) meld seamlessly into the background 102 of the corresponding memorial item 100 when affixed thereon. Provided the display sheet 106 has its print fields 110 defined as die-cut areas having an adhesive backing (or otherwise has adhesive print fields 110 which are easily separable from the remainder of the display sheet 106), the print fields may simply be peeled off and adhered to the corresponding memorial item print fields 104 as desired.

Additionally, after a display sheet 106 is printed for any of the memorial items selected by the user at the "select memorial item" screen 200, the software may return the user to the "edit image" screen 400 to generate the display sheet 106 for the next (if any) of the selected memorial items 100. In this manner, the software sequentially steps through all of the memorial items 100 selected by the user at the "select memorial item" screen 200, and allows a user to generate a display sheet 106 for each.

The invention therefore allows personalized memorial items such as displays for caskets, wreaths, flower arrangements, or other matter; funeral service programs/brochures and prayer cards; and labels for candles, memorial holiday displays (such as Christmas ornaments), crematory vessels, and the like. While the foregoing description primarily relates to use of the invention for the creation of memorial displays for funereal purposes, it could alternatively or additionally be used for births, birthdays, weddings, anniversaries, graduations, and other special events.

It is understood that a preferred version of the invention is shown and described above to illustrate different possible features of the invention and the varying ways in which these features may be combined. Apart from combining the different features of the foregoing version of the invention in varying ways, other modifications are also considered to be within the scope of the invention. Following is an exemplary list of such modifications.

In the "edit image" screen 400 of FIG. 4, or in any other screen wherein the user is presented with a simulacrum of how the display sheet image print field 110*a* and the display sheet text print field 110*b* will appear once printed, the print fields 110 could be shown surrounded by the stock image 102 appearing on the corresponding memorial item 100 selected by the user. For example, while the print fields 110 are shown in a "blank" working template 402 in FIG. 4, and the print fields 110 are shown on a "blank" facsimile display sheet 106 in FIG. 5, the working template 402 and/or display sheet 106 might instead be shown with the stock image 102 of the selected memorial item 100 in their backgrounds, behind the print fields 110. This would better enable a user to visualize how the print fields 110 will appear once applied to the selected memorial item.

Additional functionality could be added to the "edit image" screen 400 and/or to other screens to allow additional features for editing or enhancing the appearance of the image and text on the working template 402 and display sheet 106. As an example, a menu might be provided wherein a user might add text or special effects to images to be displayed in a display sheet image print field 110*a*, and/or might choose desired fonts for any text to be displayed in a display sheet print field 110*b*, and so forth.

Where a user is to produce multiple memorial items 100, the software might compile all of their user-designed print fields 110 prior to printing, and might compile and arrange them in such a manner that they will be printed on a display sheet 106 so as to cover the most area possible (and conversely to devote as little of the display sheet 106 as possible to unprinted, and thus wasted, area). In this case, since the layout of the print fields 110 is unknown until printing, the display sheet 106 cannot be precut, preperforated, or otherwise have predefined print fields 110, and it would be better to simply use a standard sheet of stock adhesive label material (or any other desired metarial) for the display sheet 106, and the print fields 110 can be cut from the display 106 thereafter. If such a display sheet 106 is used, note that it is also possible in this case to allow a user to engage in free-form design of print fields 110, i.e., to size and shape print fields 110 as the user desires, since the user will be able to cut about the borders of whatever print fields 110 are defined, regardless of their shape and size.

While one of the primary benefits of the invention is its utility in allowing fast and inexpensive personalization of memorial items having a professionally-produced appearance, even where such items are provided in formats which cannot be accommodated in standard printing devices, the invention could if desired be used to produce personalized memorial items 100 directly, i.e., to print directly onto a stock memorial item 100, so long as the item 100 could be accommodated within a standard printing device. In this case, the display sheet 106, which need not be an adhesive label sheet, is directly used as the memorial item 100. In this case, any print fields preferably have a uniform background color (e.g., a "blank" field having the same color as the underlying substrate from which the display sheet 106 is formed), or at least having a substantially uniform background color (e.g., a white background area situated adjacent or gradually blending into a yellow, light grey, or other background area), whereby matter printed therein in a contrasting color will be crisply visible. Stated differently, the print fields 110 should not contain printed "noise" such that matter printed therein will become significantly garbled, or will suffer from indeterminate content.

Finally, it should be understood that any electronic processor, display, and printer used to implement the invention need not reside in the same location, nor need they reside in the same location as the user. As an example, a user may access a website which implements the invention's functionality, and may upload the images, text, or other input, or may download some or all of the input from other electronic processors or websites. The user may then print the inputs to a display sheet using a printing device situated at the user's location, or might instead have the display sheet printed at a remote location, e.g., by transferring an order via the World Wide Web to a printing house.

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A method of generating a personalized memorial item comprising:

a. selecting a memorial item to be personnel, the memorial item being selected from the group consisting of:
   (1) a casket panel;
   (2) a memorial portrait;
   (3) a prayer card;
   (4) a funeral program;
   (5) a pocket folder;
   (6) a funeral register cover;
   (7) a memorial candle; and
   (8) a crematory urn,
   wherein the memorial item has a discrete memorial item print field defined thereon;
b. providing input to a printing system, the input including an image and a text string;
c. providing to the printing system a display sheet having a discrete print field defined thereon, the print field being:
   (1) sized and configured similarly to the memorial item print field of the memorial item, and
   (2) removable from the remainder of the display sheet;
d. printing at least one of the image and the text string on the print field;
e. removing the print field from the remainder of the display sheet; and
f. affixing the print field to the memorial item print field of the selected memorial item.

2. The method of claim 1 wherein the memorial item to be personalized is selected from a collection of memorial items having matter preprinted thereon.

3. The method of claim 1 wherein the memorial item print field is surrounded by preprinted matter having a memorial item background color, and wherein the print field of the display sheet has at least substantially the same background color.

4. The method of claim 1 wherein the print field is adhesively mounted to, and removable from, the remainder of the display sheet.

5. The method of claim 1 wherein each print field of the display sheet has an at least substantially uniform background color whereby an image or text printed therein in a different color will be crisply visible.

6. The method of claim 1 wherein:

(1) the printing system includes a working template having a template print field defined therein, and
(2) the input is displayed in the template print field with the same appearance that it will have when printed on the print field of the display sheet.

7. The method of claim 6 further comprising the step of editing the input in the template print field.

8. The method of claim 7 wherein the step of editing the input includes at least one of:

a. resizing an image with respect to its template print field, and
b. repositioning an image with respect to its template print field.

9. A method of generating a personalized memorial item comprising:

a. displaying on an electronic display a working template, the working template including one or more discrete print fields therein;

b. allowing user entry of input to one or more user selected print fields of the working template, each input including at least one of:

(1) an image, and (2) a text string;

c. providing a display sheet to a printing device, the display sheet having one or more discrete display sheet print fields displayed thereon;

d. printing the input from the print fields of the working template onto corresponding display sheet print fields of the display sheet;

e. providing a memorial item having one or more stock images displayed thereon, the memorial item being selected from the group consisting of:

(1) a casket panel;

(2) a memorial portrait;

(3) a prayer card;

(4) a funeral program;

(5) a pocket folder;

(6) a funeral register cover;

(7) a memorial candle; and (8) a crematory urn;

f. removing one or more of the display sheet print fields from the display sheet; and g. adhering the removed display sheet print fields to the memorial item.

10. The method of claim 9 wherein the display sheet print fields are each easily removable from the remainder of the display sheet without cutting.

11. The method of claim 9 further comprising the step of allowing user editing of inputs within the working template, such editing including:

a. resizing an image with respect to its print field, and b. repositioning an image with respect to its print field.

12. The method of claim 9 wherein the display sheet print fields each have a size and placement, relative to any other display sheet print fields, which is at least substantially similar to the size and placement of the print fields on the working template, whereby the working template provides a representation of tbs display sheet to a user.

13. The method of claim 9 wherein the memorial item has one or more discrete print fields displayed thereon, and wherein the display sheet print fields are adhered to the print fields of the memorial item.

14. A method of generating a personalized memorial item comprising:

a. providing a display sheet having one or more discrete print fields defined thereon, each print field:

(1) being readily separable from the display sheet, and (2) having an at least substantially uniform background color whereby matter printed therein in a different color will be crisply visible;

b. providing a working template on an electronic processor, the working template including images of one or more of the print fields of the display sheet, c. allowing user entry into the electronic processor of one or more inputs, each input including at least one of:

(1) an image, and (2) a text string;

d. assigning each input to a respective print field of the working template;

e. allowing user editing of each input within its print field of the working template;

f. printing the inputs to the display sheet, each input being printed within a display sheet print field corresponding to the print field of the working template to which it was assigned;

g. providing a memorial item, the memorial item being selected from the group of:

(1) a casket panel;

(2) a memorial portrait;

(3) a prayer card;

(4) a funeral program;

(5) a pocket folder;

(6) a funeral register cover;

(7) a memorial candle; and (8) a crematory urn;

h. separating one or more of the print fields from the display sheet; and i. affixing the separated print fields to the memorial item.

15. The method of claim 14 wherein the display sheet has an adhesive backing with a removable backing sheet thereon, and wherein the print fields are peelable from the backing sheet and individually removable from the remainder of the backing sheet.

16. The method of claim 14 wherein the memorial item has one or more discrete print fields defined thereon, and wherein the print fields separated from the display sheet are affixed to the print fields of the memorial item.

17. The method of claim 14 further comprising at least one of the steps of:

a. folding the display sheet; and b. stapling the display sheet.

18. A method of generating a personalized memorial item comprising:

a. selecting a memorial item to be personalized, wherein the memorial item:

(1) bears matter preprinted thereon, the preprinted matter being at least one of text and an image;

(2) has a discrete memorial item print field defined thereon adjacent the preprinted matter, and (3) is selected from the group consisting of:

(A) a casket panel;

(B) a memorial portrait;

(C) a prayer card;

(D) a funeral program;

(E) a pocket folder;

(F) a funeral register cover;

(G) a memorial candle; and (H) a crematory urn;

b. providing input to a printing system, the input being at least one of an image and a text string;

c. providing to the printing system a display sheet having a discrete display sheet print field defined thereon, the display sheet print field being:

(1) sized and configured similarly to the memorial item print field of the memorial item, and (2) removable from the remainder of the display sheet;

d. printing the input on the display sheet print field;

e. removing the display sheet print field from the remainder of the display sheet; and f. affixing the display sheet print field to the memorial item print field of the selected memorial item.

* * * * *